United States Patent [19]
Endo

[11] Patent Number: 6,032,941
[45] Date of Patent: Mar. 7, 2000

[54] SHEET CONVEYING APPARATUS WITH INTERNAL CONTROL

[75] Inventor: Saijiro Endo, Odawara, Japan

[73] Assignee: Canon Kabushiki Kaisha, Tokyo, Japan

[21] Appl. No.: 08/992,081

[22] Filed: Dec. 17, 1997

[30] Foreign Application Priority Data

Dec. 24, 1996 [JP] Japan .................................... 8-343035

[51] Int. Cl.$^7$ .................................................. B65H 85/00
[52] U.S. Cl. ........................ 271/3.19; 271/225; 271/3.15; 271/3.13; 271/291; 271/902
[58] Field of Search ................... 271/3.19, 902, 271/3.01, 186, 303, 291, 225, 258.01, 3.13, 265.01

[56] References Cited

U.S. PATENT DOCUMENTS

| | | | |
|---|---|---|---|
| 4,667,951 | 5/1987 | Honjo et al. | 271/902 X |
| 4,817,933 | 4/1989 | Honjo et al. | 271/902 X |
| 5,100,123 | 3/1992 | Kaguira et al. | 271/164 |
| 5,132,742 | 7/1992 | Goto | 271/291 X |
| 5,351,112 | 9/1994 | Naito et al. | 271/3.1 X |
| 5,455,659 | 10/1995 | Ishizu et al. | 399/18 |
| 5,488,463 | 1/1996 | Nimura et al. | 271/3.15 X |
| 5,512,993 | 4/1996 | Endo et al. | 399/335 |
| 5,513,840 | 5/1996 | Fujita et al. | 271/291 X |
| 5,612,776 | 3/1997 | Machino et al. | 399/43 |

FOREIGN PATENT DOCUMENTS

| | | |
|---|---|---|
| 0 370 784 | 5/1990 | European Pat. Off. . |
| 0 402 836 | 12/1990 | European Pat. Off. . |
| 0370784 | 3/1992 | European Pat. Off. . |
| 0 477 946 | 4/1992 | European Pat. Off. . |
| 0 659 668 | 6/1995 | European Pat. Off. . |
| 32 28 570 | 2/1983 | Germany . |
| 196 22 167 | 12/1996 | Germany . |

*Primary Examiner*—Christopher P. Ellis
*Assistant Examiner*—Patrick Mackey
*Attorney, Agent, or Firm*—Fitzpatrick, Cella, Harper & Scinto

[57] ABSTRACT

A sheet material conveying apparatus has a conveying path for directing sheet materials supported on a supporting portion one by one to an image processing position and also directing them to a discharging portion after the completion of image processing, and a reversing path for containing a predetermined number of sheet materials therein, and reversing the sheet materials and directing them to the image processing position. When the interval between the predetermined number of sheet materials to be directed into the reversing path widens to such an extent that the sheet materials cannot be contained in the reversing path, preceding one of the sheet materials is decelerated or stopped in conformity with the widening to enable the predetermined number of sheets to be contained in the reversing path.

15 Claims, 14 Drawing Sheets

READ-IN OF 1st ORIGINAL
FRONT SURFACE STARTED
(2nd ORIGINAL IS SUPPLYING)

READ POSITION

READ-IN OF 1st ORIGINAL
FRONT SURFACE COMPLETED
READ-IN OF 2nd ORIGINAL
FRONT SURFACE STARTED

READ-IN OF 2nd ORIGINAL
FRONT SURFACE COMPLETED
READ-IN OF 1st ORIGINAL
REAR SURFACE STARTED

READ-IN OF 1st ORIGINAL STARTED
(2nd ORIGINAL IS SUPPLYING)

READ-IN OF 1st ORIGINAL COMPLETED
READ-IN OF 2nd ORIGINAL STARTED
(3rd ORIGINAL IS SUPPLYING)

READ-IN OF 2nd ORIGINAL COMPLETED
READ-IN OF 3rd ORIGINAL STARTED
(4th ORIGINAL IS SUPPLYING)
(1st ORIGINAL IS DISCHARGING)

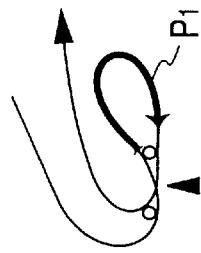

FIG. 4A
READ-IN OF 1st ORIGINAL FRONT SURFACE STARTED
READ POSITION

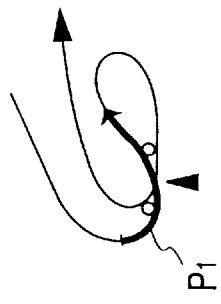

FIG. 4B
1st ORIGINAL FRONT SURFACE IS READING (SIMULTANEOUSLY IS REVERSING)

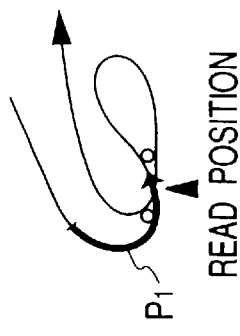

FIG. 4D
READ-IN OF 1st ORIGINAL REAR SURFACE IS READING (2nd ORIGINAL IS SUPPLYING)

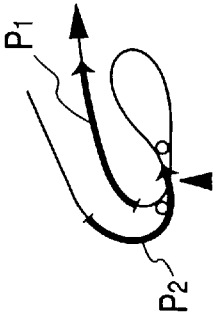

FIG. 4C
READ-IN OF 1st ORIGINAL REAR SURFACE STARTED

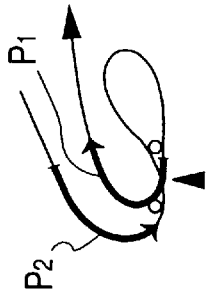

FIG. 4E
READ-IN OF 1st ORIGINAL REAR SURFACE COMPLETED
READ-IN OF 2nd ORIGINAL FRONT SURFACE STARTED

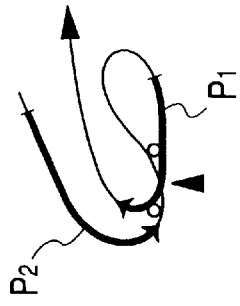

FIG. 4F
2nd ORIGINAL FRONT SURFACE IS READING (1st ORIGINAL IS DISCHARGING)

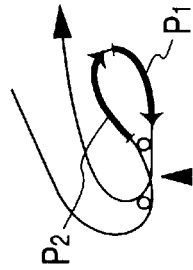

FIG. 6A

READ-IN OF 1st ORIGINAL
FRONT SURFACE STARTED
(2nd ORIGINAL IS SUPPLYING)

READ POSITION

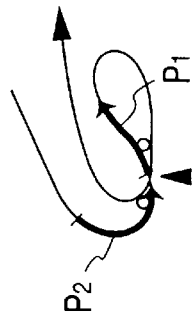

FIG. 6B

READ-IN OF 1st ORIGINAL
FRONT SURFACE COMPLETED

READ-IN OF 2nd ORIGINAL
FRONT SURFACE STARTED

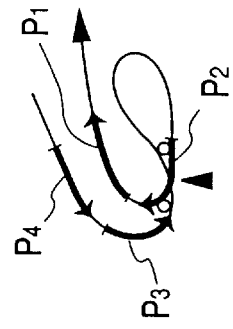

FIG. 6C

READ-IN OF 2nd ORIGINAL
FRONT SURFACE COMPLETED

READ-IN OF 1st ORIGINAL
REAR SURFACE STARTED

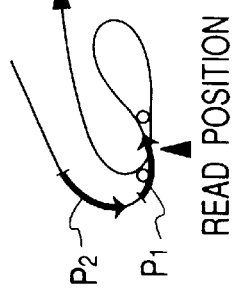

FIG. 6D

READ-IN OF 1st ORIGINAL
REAR SURFACE COMPLETED

READ-IN OF 2nd ORIGINAL
REAR SURFACE STARTED (3rd ORIGINAL IS SUPPLYING)

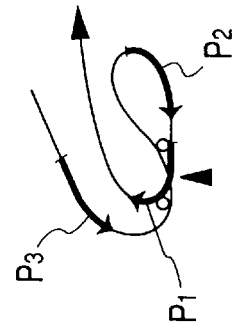

FIG. 6E

READ-IN OF 2nd ORIGINAL
REAR SURFACE COMPLETED

READ-IN OF 3rd ORIGINAL
FRONT SURFACE STARTED (1st ORIGINAL IS DISCHARGING)
(4th ORIGINAL IS SUPPLYING)

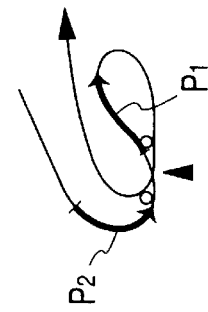

FIG. 7A

READ-IN OF 1st ORIGINAL FRONT SURFACE STARTED
(SUPPLY OF 2nd ORIGINAL IS DELAYING)

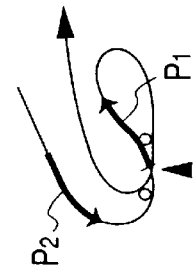

FIG. 7B

READ-IN OF 1st ORIGINAL FRONT SURFACE COMPLETED, THEN STOPPED

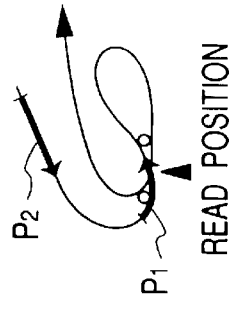

FIG. 7C

READ-IN OF 2nd ORIGINAL FRONT SURFACE STARTED
CONVEY OF 1st ORIGINAL RE-STARTED

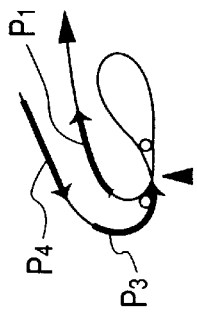

FIG. 7D

READ-IN OF 2nd ORIGINAL FRONT SURFACE COMPLETED
READ-IN OF 1st ORIGINAL REAR SURFACE STARTED

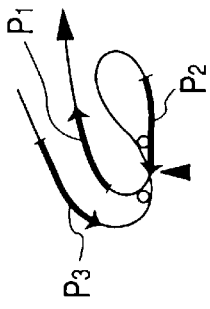

FIG. 7E

2nd ORIGINAL REAR SURFACE IS READING
READ-IN OF 1st ORIGINAL REAR SURFACE COMPLETED, IS DISCHARGING
(3rd ORIGINAL IS SUPPLYING)

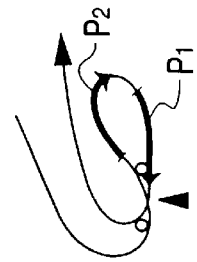

FIG. 7F

READ-IN OF 2nd ORIGINAL REAR SURFACE COMPLETED, IS DISCHARGING
READ-IN OF 3rd ORIGINAL FRONT SURFACE STARTED
(4th ORIGINAL IS SUPPLYING)

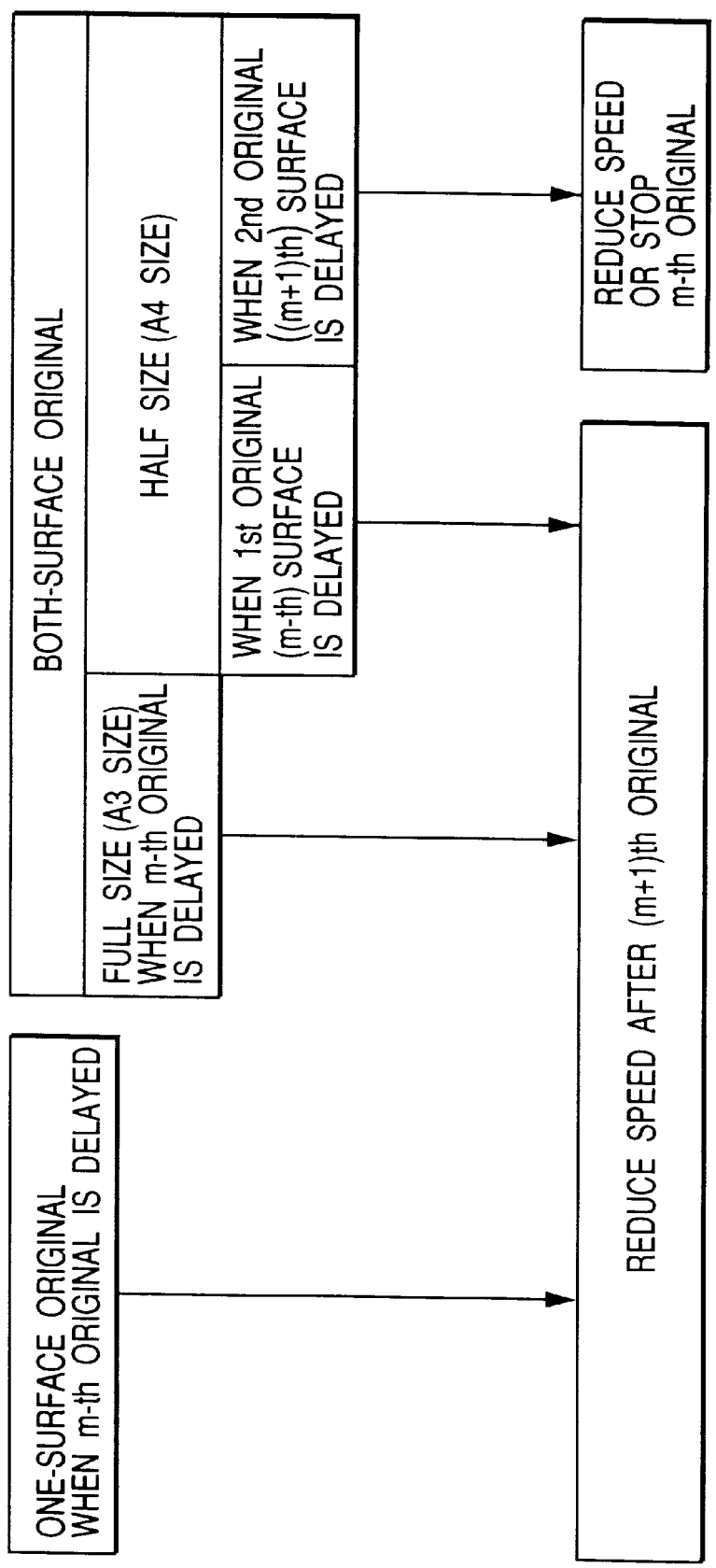

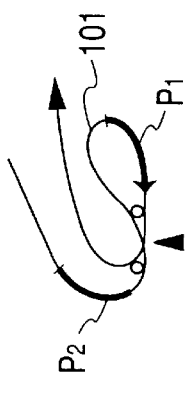
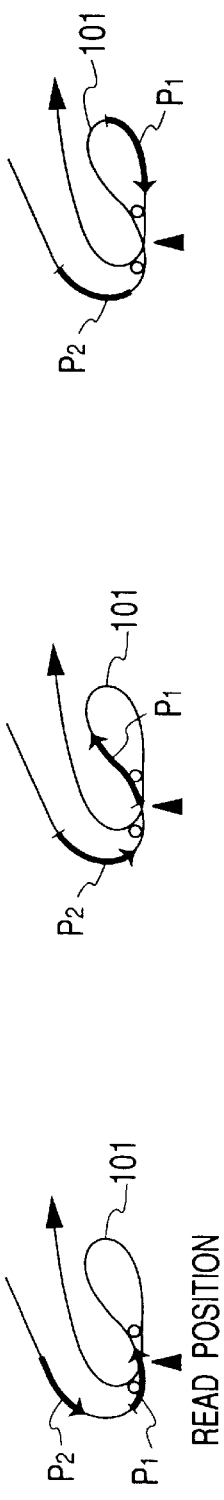
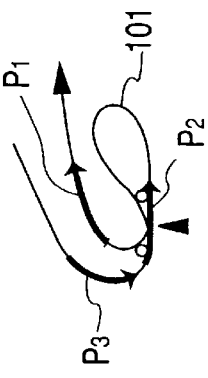

SHEET CONVEYING APPARATUS WITH INTERNAL CONTROL

BACKGROUND OF THE INVENTION

1. Field of the Invention

This invention relates to a sheet material conveying apparatus, and particularly to a sheet material conveying apparatus for supplying sheet materials placed, for example, on a supporting portion one by one to an image processing position, and image-processing one surface or both surfaces of the sheet material, and thereafter conveying the sheet material to a discharging portion. Specifically, it relates to a sheet original conveying apparatus attached to an image processing apparatus such as a copying apparatus, a facsimile apparatus, a scanner or a printer.

2. Related Background Art

Conventionally, a sheet material conveying apparatus attached to an image processing apparatus such as a copying apparatus, a facsimile apparatus, a scanner or a printer has heretofore been designed to supply sheet materials placed on a supporting portion one by one to an image processing position, and image-process one surface or both surfaces of the sheet material, and thereafter convey the sheet material to a discharging portion.

A case where the image processing is the process of reading the image of an original will hereinafter be shown by way of example and described.

Of original reading apparatuses provided with the conveying apparatus, as an apparatus coping with an original having images to be read on the front and back surfaces thereof, there is well known an apparatus capable of first effecting the reading of the image of the front surface of the original, and then automatically reversing the original surfaces in an original feeding apparatus and re-supplying the reversed original to the original reading position to effect the reading of the image of the back surface of the original.

Also, in a digital image processing apparatus wherein the reading and memory preservation or the like of image data are combined together, it has become more important than before to increase the number of sheet materials such as originals processed per unit time from the necessity of reading or processing images within a copying time. For that purpose, it is necessary to make the interval between originals (original interval) small and minimize the afore described time for reversing the original surface.

With this as the background, a case where not so-called switch back reversal but reversal using a U-turn conveying path is adopted for the reversal of the original because of the ease of the mirror image processing of images accumulated in a memory by digitization has increased.

Further, in the U-turn reversing process in such a digital image processing apparatus, the following control becomes possible making the most of the merit that the free processing of image signals accumulated in the memory is possible. It is the control that only the images of the front surfaces of a predetermined number of originals are collectively read in, then the originals are successively subjected to U-turn reversing process, and then the images of the back surfaces of the originals are likewise collectively read in. By effecting such control, the processing speed is improved as compared with a case where the images of the front and back surfaces of each original are read in.

In the above-described example of the prior art, however, the originals supported on a supporting portion (tray) are first supplied one by one to an image reading position via a pay-away portion and a separating portion, and therefore there may sometimes occur some delay of the feeding time in the pay-away and separation of the originals. This delay of the feeding time results in an increase in the sheet interval. Thus, when considering a case where as previously described, a predetermined number of originals are collectively image-processed, the full length of the ranging originals is also increased by such an increase in the sheet interval.

On the other hand, since the predetermined number of originals are collectively contained in the path and reversal-processed, the length of a reversing path is determined in conformity with the full length of the predetermined number of originals contained.

These facts have led to the problem that when the feed timing of the original is delayed in the manner described above, the sheet interval increases, so that the full length of the ranging originals increases and a predetermined number of originals become incapable of being contained in the reversing path.

As means for solving such a problem, there is known an example using control as will be described below. When the sheet interval increases in the manner described above and a predetermined number of originals become incapable of being contained in the reversing path, the number of originals to be contained in the reversing path is decreased and originals which could not be contained are caused to stand by on this side of the entrance to the reversing path and are processed.

An example of the processing in a reversing path capable of containing, for example, two sheets of A4 size originals is shown in FIGS. 14A to 14E of the accompanying drawings.

As shown in FIGS. 14A to 14E, there are two originals $P_1$ and $P_2$ originally contained in a reversing path 101 and to be collectively processed. Let it be assumed here that in FIG. 14A, a delay during sheet feeding has occurred to the second original $P_2$. Neither of the two sheets can intactly be contained in the reversing path 101, and therefore in FIG. 14B, the second original $P_2$ is caused to stand by on this side of the entrance to the reversing path 101. Then, in FIGS. 14B to 14D, the reversing process of the first original $P_1$ is completed, then in FIG. 14E, the conveyance of the second original $P_2$ into the reversing path 101 is started to effect the similar processing.

By using such control, the originals can be processed without colliding against each other.

However, taking the case described with reference to FIGS. 14A to 14E as an example, the two originals $P_1$ and $P_2$ which originally should have been collectively processed are processed one by one after all. And when a delay of sheet feeding occurs continuously, there arises the problem that the original processing speed (productivity) is reduced to about a half.

SUMMARY OF THE INVENTION

It is the object of the present invention to provide a sheet material conveying apparatus which, even if a delay occurs to the supply (feeding, separation or the like) of a sheet material to a processing position, can minimize a reduction in the processing speed for the sheet material by delay.

To achieve the above object, the present invention has a conveying path for directing sheet materials placed on a supporting portion one by one to an image processing position and directing them to a discharging portion after the completion of image processing, and a reversing path for containing a predetermined number of sheet materials therein and reversing them to direct them to the image processing position. It is characterized in that when the sheet interval between the predetermined number of sheet materials to be directed into the reversing path widens to such an extent that the sheet materials cannot be contained in the reversing path, preceding one of the sheet materials is decelerated or stopped in conformity with the widening to enable the predetermined number of sheets to be contained in the reversing path.

According to the above-described construction, design is made such that when for example, a delay occurs to the supply (feeding, separation or the like) of sheet materials to the processing position and the interval between a predetermined number of sheet materials to be directed into the reversing path widens to such an extent that the sheet materials cannot be contained in the reversing path, conveyance control for decelerating or stopping preceding one of the sheet materials in conformity with the widening is effected to enable the predetermined number of sheet materials to be contained in the reversing path and therefore, a reduction in the processing speed for the sheet materials can be minimized.

BRIEF DESCRIPTION OF THE DRAWINGS

FIGS. 4A, 4B, 4C, 4D, 4E and 4F are views simulating the manner in which a both-surface original of a full size (in the present embodiment, A3 size) is conveyed.

FIGS. 6A, 6B, 6C, 6D and 6E are views simulating the manner in which a both-surface original of a half size (in the present embodiment, A4 size) is conveyed.

FIGS. 7A, 7B, 7C, 7D, 7E and 7F are views simulating the manner in which a both-surface original of the half size (in the present embodiment, A4 size) is conveyed.

FIG. 8 is a diagram showing the conveyance sequence of originals in various cases.

FIGS. 14A, 14B, 14C, 14D and 14E show the flows of an original when the delay of an original occurs in the case of a conventional both-surface original (A4 size).

DESCRIPTION OF THE PREFERRED EMBODIMENTS

Some embodiments of a sheet material conveying apparatus to which the present invention is applied will hereinafter be described specifically with reference to the drawings. In the following embodiments, a sheet material conveying apparatus attached to an image processing apparatus such as a copying apparatus, a facsimile apparatus, a scanner or a printer will be shown by way of example and described.

First Embodiment

Figure 1:
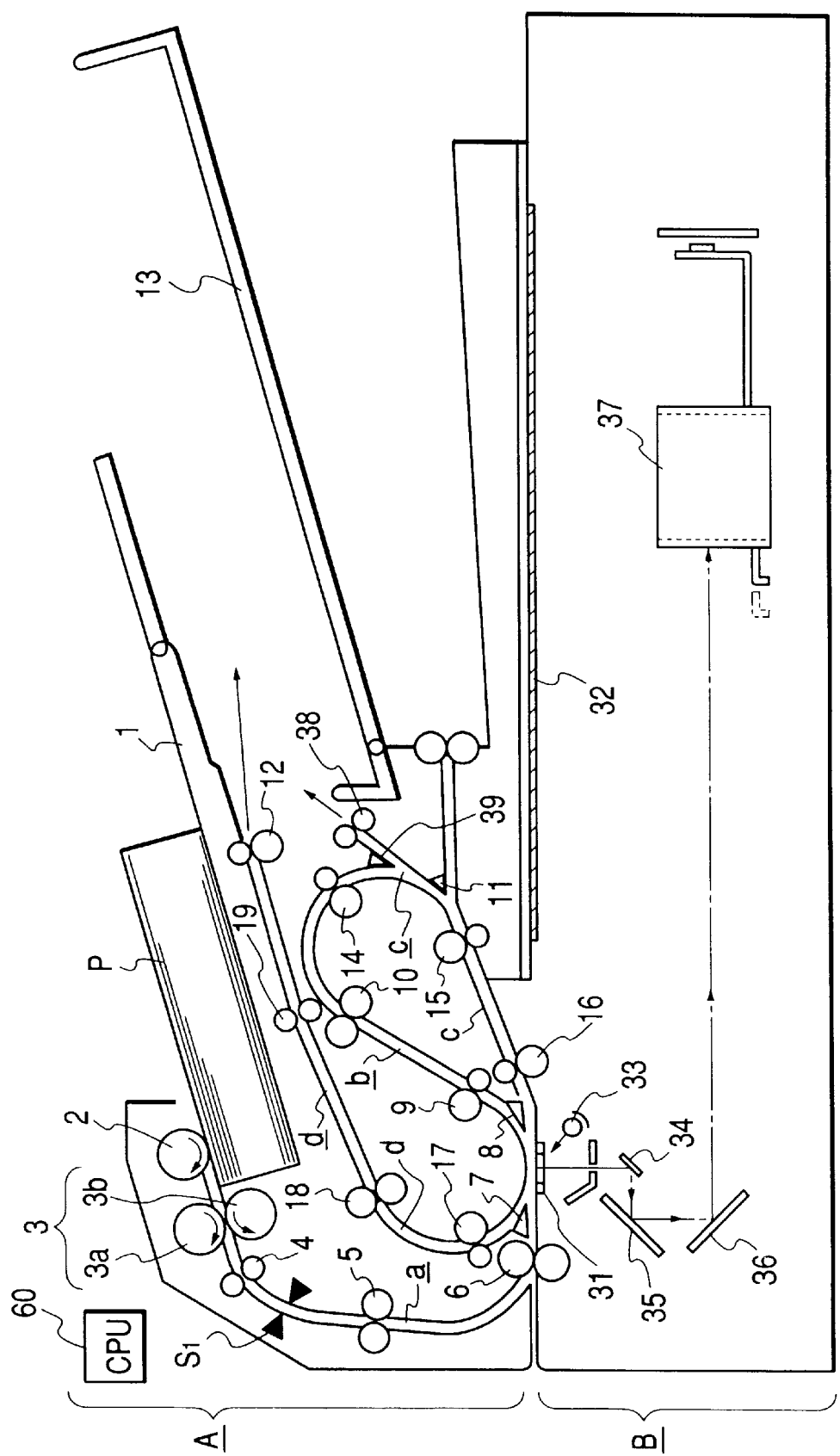
FIG. 1 schematically shows the construction of an embodiment of an image reading apparatus provided with an automatic original feeding apparatus to which the present invention is applied.

A sheet material conveying apparatus according to a first embodiment will hereinafter be described with reference to the drawings. In the present embodiment, an automatic original feeding apparatus as a sheet material conveying apparatus attached to an image reading apparatus (image processing apparatus) is shown by way of example. FIG. 1 is a side cross-sectional view schematically showing the construction of an image reading apparatus provided with the automatic original feeding apparatus according to the present embodiment.

In FIG. 1, the letter A generally designates the automatic original feeding apparatus, and the letter B generally denotes the image reading apparatus. The automatic original feeding apparatus A and the image reading apparatus B are used in combination and usually, the read image information of an original is inputted to a printer, a computer or the like through a cable or the like.

The automatic original feeding apparatus A is mounted openably and closably with respect to the upper surface of the image reading apparatus B, and FIG. 1 shows a state in which the automatic original feeding apparatus A has been brought down and closed about a hinge portion (not shown) provided on the inner side of the apparatus with respect to the upper surface of the image reading apparatus B.

In the image reading apparatus B, the reference numerals 31 and 32 designate two glass platens as first and second original reading portions (original reading positions) disposed on the upper surface of the apparatus B. The first original reading portion (a predetermined position) 31 is for flowingly reading an original, and the second original reading portion 32 is for fixedly reading an original. The reference numerals 33 to 37 denote an original reading system disposed in the apparatus B, and the reference numeral 33 designates an original illuminating lamp (reading means) disposed at a lower location in the first original reading portion 31 for reading the image information of an original being conveyed, the reference numerals 34, 35 and 36 denote first to third scanning mirrors, and the reference numeral 37 designate a photoelectric reading unit.

In the automatic original feeding apparatus A, the reference numeral 1 denotes an original supporting tray (original supporting table), and originals P as sheet materials are supported and set on this tray 1 with their image bearing surfaces facing upward. During the conveyance of an original, a feeding roller 2 is rotated on the basis of an original feeding start signal and bears against the upper surface of the supported originals P with a predetermined pressure force so that a feeding force acts on the uppermost one of the supported originals P, and the uppermost original is paid away into the apparatus A. The uppermost original is then separated from the underlying originals by a pair of separating and feeding rollers 3 to prevent the feeding of multiple originals, so only the uppermost original enters a first original conveying path (feeding path) a. The reference numerals 4, 5 and 6 designate pairs of original conveying rollers in the first original conveying path a.

A reading mode for the originals will now be described. A one-surface reading mode will first be described, and then a both-surface reading mode will be described.

(i) One-Surface Reading Mode (FIG. 1)

The original which has entered the first original conveying path a as described above passes the lower surface side of a first flapper 7 and passes the upper surface of the platen of the first original reading portion 31 while keeping close contact with this platen, and further passes the lower surface side of a second flapper 8 and enters a third original conveying path c. The original further passes the upper surface side of a third flapper 11 and the lower surface side of a fourth flapper 39, and is discharged onto a discharge tray (a sheet discharge table) 13 which is a discharging portion by a pair of discharge rollers 38. The reference numerals 15 and 16 denote pairs of original conveying rollers in the third original conveying path c.

The original illuminating lamp (reading means) 33 and the first to third scanning mirrors 34, 35 and 36 of the original reading system of the image reading apparatus 13 are held at locations shown in FIG. 1 which correspond to the portions below the platen of the first original reading portion 31. The original being conveyed has its downwardly facing image surface illuminated by the original illuminating lamp 33 in the process of passing the upper surface of the platen of the first original reading portion 31 while keeping close contact with the upper surface of the platen. And, the reflected light of the illuminating light from the surface of the original enters the photoelectric reading unit 37 via the first to third scanning mirrors 34, 35 and 36, and the image information of the original being conveyed is flow-read.

By the repetition of the above-described operation cycle, the separation, feeding, reading and discharging of one of the originals P on the original supporting tray 1 in the one-surface reading mode are sequentially done.

(ii) Both-Surface Reading Mode (FIG. 1)

In the case of the both- surface reading mode in which the images on the front and back surfaces of an original are read, in item (i) above, the original having had the image information on one surface (front surface) thereof read by passing the upper surface of the platen of the first original reading portion 31 passes the upper surface side of the second flapper 8 and enters a second original conveying path b. The original further passes over the upper surface of a third flapper 11 by the changeover of the posture of this flapper 11 and enters a third original conveying path c, and is reversed and passes the lower surface side of the second flapper 8. Thus, the original is fed again onto the upper surface of the platen of the first original reading portion 31 from the direction opposite to that in the case of item (i) above.

The second original conveying path b and the third original conveying path c together constitute original conveying paths b, c for reversal for reversing a both-surface original. The reference numerals 9 and 10 designate pairs of original conveying rollers in the second original conveying path b, and the reference numerals 14, 15 and 16 denote pairs of original conveying rollers in the third original conveying path c.

In the process of the reversed re-fed original passing the upper surface of the platen of the first original reading portion 31 while keeping close contact with the upper surface with said platen, the image information of the other surface (back surface) which is the downwardly facing image surface of the original is read by the original reading system 33 to 37 of the image reading apparatus B. The original having had the image information of its other surface (back surface) read by passing the upper surface of the platen of the first original reading portion 31 passes over the upper surface of the first flapper 7 and enters a fourth original conveying path d, and is discharged onto the discharge tray 13 by a pair of discharge rollers 12. The reference numerals 17, 18 and 19 designate pairs of original conveying rollers in the fourth original conveying path d.

By the repetition of the above-described operation cycle, the separation, feeding, reading and discharging of one of the originals P supported on the original supporting tray 1 in the both-surface reading mode are sequentially done.

In the automatic original feeding apparatus A, the feeding roller 2 is rotated and bears against the uppermost one of the supported originals P with a predetermined pressure force for feeding, but at this time, there arises a case where slip occurs between the feeding roller 2 and the uppermost original and the original P is not paid away at predetermined timing. Also, it is known that in the pair of separating and feeding rollers 3 after that, the speed of the original is reduced more than the speed of the pair of rollers 3a and 3b due to the separating and feeding roller 3b being rotated in the reverse direction for the prevention of multiplex feeding (the roller 3a is rotated in the forward direction). These phenomena are the main cause of the original being not paid away at predetermined timing. If a sufficient conveying force is given to the pair of conveying rollers 4, the original will thereafter be conveyed at a desired speed.

So, in FIG. 1, an original leading end sensor $S_1$ is disposed at a position after the original has passed the feeding roller 2, the pair of separating and feeding rollers 3 and the pair of conveying rollers 4 which form the above-mentioned main cause (i.e., the position after the speed of the original has become stable). A control device 60 judges whether the conveyance time until the leading end of the original is detected by this original leading end sensor $S_1$ is delayed as compared with a normal conveyance time, and if there is a delay in the conveyance, the control device 60 recognizes it.

Also, by the detection of the delay of the conveyance based on the original leading end detection signal by the original leading end sensor $S_1$, the control device (control means) 60 controls so as to decelerate or stop the rotational operation of the pairs of conveying rollers 4, 5 and 6 upstream of the first original reading portion 31, as will be described later.

The speed control (control of deceleration or stoppage) of the pairs of conveying rollers 4, 5 and 6 upstream of the first original reading portion 31 when the fed original is delayed in conveyance differs depending on the reading modes such as the one-surface reading of a one-surface original and the both-surface reading of a both-surface original. The size of the original based on the size of the original entering the original conveying paths b and c for reversal (in the case of the full size, a sheet enters, and in the case of the half size, two sheets enter) etc., and therefore, each control based on the reading modes and the size of the original will hereinafter be described.

Figure 2A:
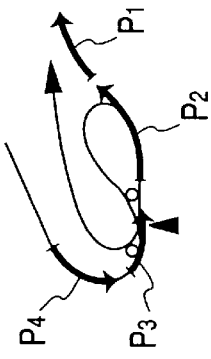
FIGS. 2A, 2B and 2C are views simulating the manner in which a one-surface original is conveyed.
Figure 2B:
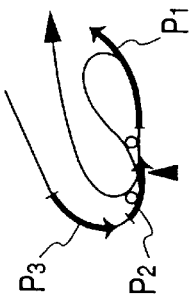
Figure 2C:
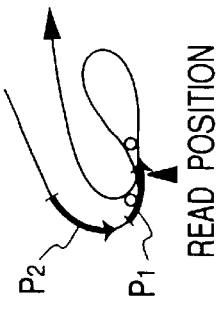

In the case of a one-surface original, how to cope with the delay in the conveyance of this one-surface original will first be described. FIGS. 2A to 2C are views simulating the manner in which a one-surface original is conveyed.

If at this time, the m-th original $P_1$ is later by $\Delta t$ than predetermined feed timing, when the next (m+1)th original $P_2$ is paid away at the initial feed timing, the space between the originals $P_1$ and $P_2$ may become short. Alternately, if $\Delta t$ is greater, when the m-th original $P_1$ is still fed from the original supporting tray 1, the feed timing therefor may come and multiplex feeding may take place. So, in the case as described above, originals $P_2, P_3, P_4, \ldots$ after the (m+1)th original are started with their feed timing delayed by $\Delta t$ (see FIG. 8).

Figure 3C:
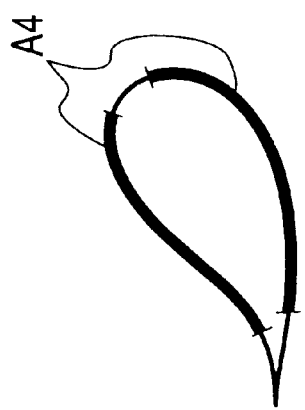
FIGS. 3A, 3B and 3C are illustrations of an original conveying path for reversal.
Figure 3B:
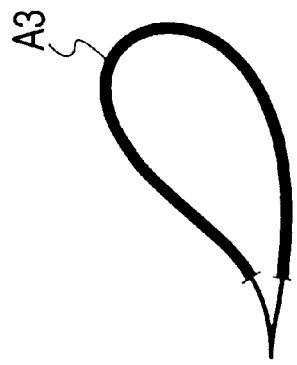
Figure 3A:
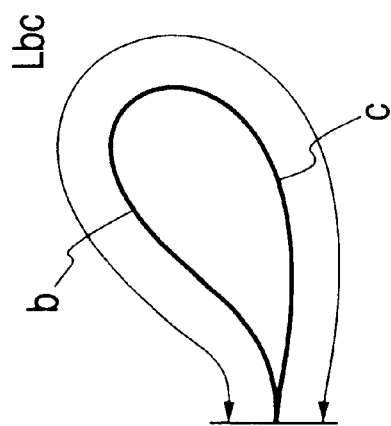

Description will now be made of how to cope, in the case of a both-surface original, with a delay in the conveyance of this both-surface original. FIGS. 3A to 3C are illustrations of the original conveying path for reversal, FIGS. 4A to 4F are views simulating the manner in which a both-surface original of the full size (in the present embodiment, A3 size) is conveyed, FIG. 5 is a schematic view showing the collision of originals, FIGS. 6A to 6E and FIGS. 7A to 7F are views simulating the manner in which a both-surface original of the half size (in the present embodiment, A4 size) is conveyed, and FIG. 8 is a diagram showing the conveyance sequence of an original in various cases.

Here, description will be made of the original conveying paths b and c for reversing a both-surface original. In the present embodiment, as shown in FIG. 3A, the length Lbc of the original conveying paths b and c for reversal is 532 mm, and for example, an original of A3 size is 420×297 mm, and therefore one such original can be contained in the original conveying paths b and c for reversal having the length Lbc (see FIG. 3B). Also, an original of A4 size is 210×297 mm, so, two such originals can be contained in the original conveying paths b and c for reversal having the length Lbc. In the ensuing description, of a plurality of originals, the m-th original read in earlier will be referred to as the first original, and the (m+1)th original read in later will be referred to as the second original.

The conveyance control for a both-surface original of A3 size will first be described with reference to FIGS. 4A to 4F. The m-th original (hereinafter referred to as the "first original") $P_1$ is reversed as shown in FIG. 4C while having its front surface read by the first original reading portion 31 as shown in FIGS. 4A and 4B. Thereafter, the first original $P_1$ is re-fed to the first original reading portion 31 and has its back surface read as shown in FIG. 4D. Immediately before the reading of the first original $P_1$ is terminated as shown in FIG. 4E, the second original $P_2$ is conveyed toward the first original reading portion 31, and in a state as shown in FIG. 4F wherein the reading of $P_1$ has been terminated, the front surface of $P_2$ is read by the first original reading portion 31.

Figure 5:
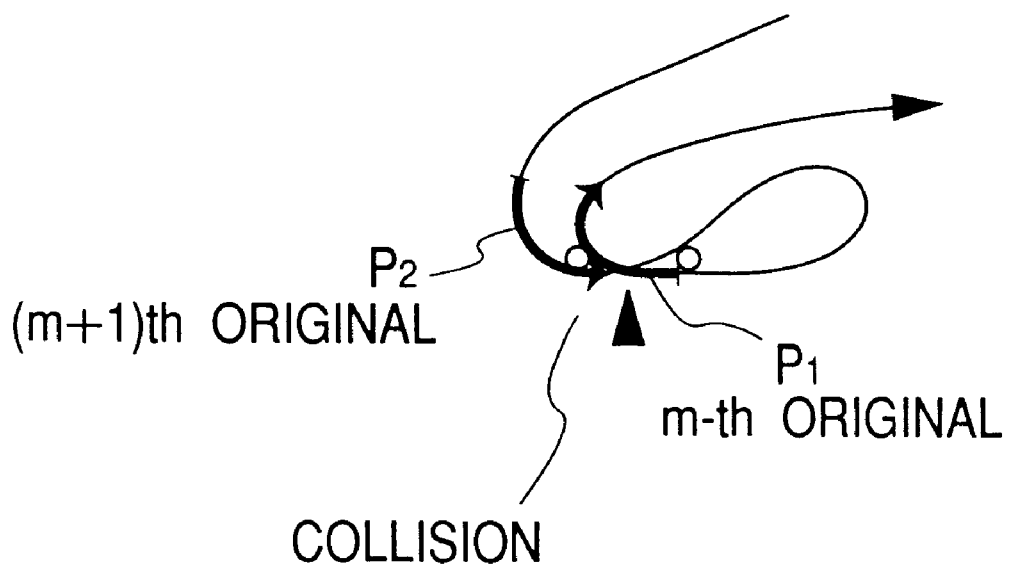
FIG. 5 is a schematic view showing the collision of originals.

Assuming that at this time, the m-th original $P_1$ has come to the reading position (the first original reading portion 31) with a delay, the (m+1)th original $P_2$ is conveyed at such timing as shown in FIG. 5 when the m-th original $P_1$ should come at the timing shown in FIG. 4E, so that the two originals $P_1$ and $P_2$ collide against each other at the reading position. So, control is effected by the control device 60 such that when the m-th original $P_1$ fed and separated is delayed from predetermined timing and the above-described collision of the two originals is likely to occur. Thus, the feed timing of the both-surface original after the (m+1)th original is started with a delay of $\Delta t$ as in the case of the feeding of the one-surface original (see FIG. 8).

The conveyance control of a both-surface original of A4 size will now be described with reference to FIGS. 6A to 6E. The m-th original (hereinafter referred to as "the first original") $P_1$ and the (m+1)th original (hereinafter referred to as "the second original") $P_2$ have their front surfaces successively read at the reading position (the first original reading portion 31) and are both carried into the original conveying paths b and c for reversal as shown in FIG. 6C. When as shown in FIGS. 6D and 6E, the originals $P_1$ and $P_2$ are carried out of the original conveying paths b and c for reversal through the reading position, succeeding ((m+2)th and (m+3)th) originals $P_3$ and $P_4$ are fed to the reading position.

When the conveyance delay occurs in the case of the first original $P_1$ which is the both-surface original of A4 size, the feed timing of the subsequent original can be started with a delay as during the feeding of a one-surface original (see FIG. 8).

On the other hand, FIGS. 7A to 7E show the conveyance control of an original when the original is a both-surface original and the conveyance delay occurs to the second original (this is judged from the fact that the time from after the generation of a separation feeding start signal until the sensor $S_1$ detects a sheet is longer than a predetermined time).

Let it be assumed that as shown in FIG. 7A, the m-th original (hereinafter referred to as "the first original") $P_1$ is fed at predetermined timing, then after the (m+1)th original (hereinafter referred to as "the second original") $P_2$ is fed with a delay. The image on the front surface of the first original $P_1$ is read in (a predetermined time may be counted from after the detection by the sensor $S_1$, or other sensor may be provided near the original reading portion 31 to detect the termination), thenafter the conveyance of the first original $P_1$ is stopped as shown in FIG. 7B (see FIG. 8).

The second original $P_2$ fed with a delay continues to be fed while the first original $P_1$ remains stopped, and as shown in FIG. 7C, it soon arrives at the reading position (the first original reading portion 31). During the stoppage or deceleration of the operation shown in FIG. 7B, the sheet interval between the first original $P_1$ and the second original $P_2$ is gradually shortened, and when this sheet interval has reached a predetermined value (such a value that the first original $P_1$ and the second original $P_2$ can be contained in the original conveying paths b and c for reversal which is judged from a count number based on the detection by the sensor $S_1$), the conveyance of the first original $P_1$ which has so far been stopped is started again.

Thus, the first original $P_1$ and the second original $P_2$ are conveyed while maintaining a predetermined sheet interval therebetween, so as shown in FIG. 7D, both of the two originals $P_1$ and $P_2$ can be contained and reversed in the original conveying paths b and c for reversal. Thereafter, the originals $P_1$ and $P_2$ reversed in the original conveying paths b and c for reversal have the images of their back surfaces successively read in and are discharged out of the apparatus (onto the discharge tray 13). Simultaneously therewith, as shown in FIGS. 7E and 7F, the feeding of the next originals $P_3$ and $P_4$ to the reading position is started.

By effecting such control, even if the feed timing is delayed and the sheet interval between originals is widened, image processing is possible with the delay by the loss time (waiting time) corresponding to the widened sheet interval, and a reduction in the original processing capability can be minimized.

The control described above is collectively shown in FIGS. 9 and 10.

Second Embodiment

Figure 11:
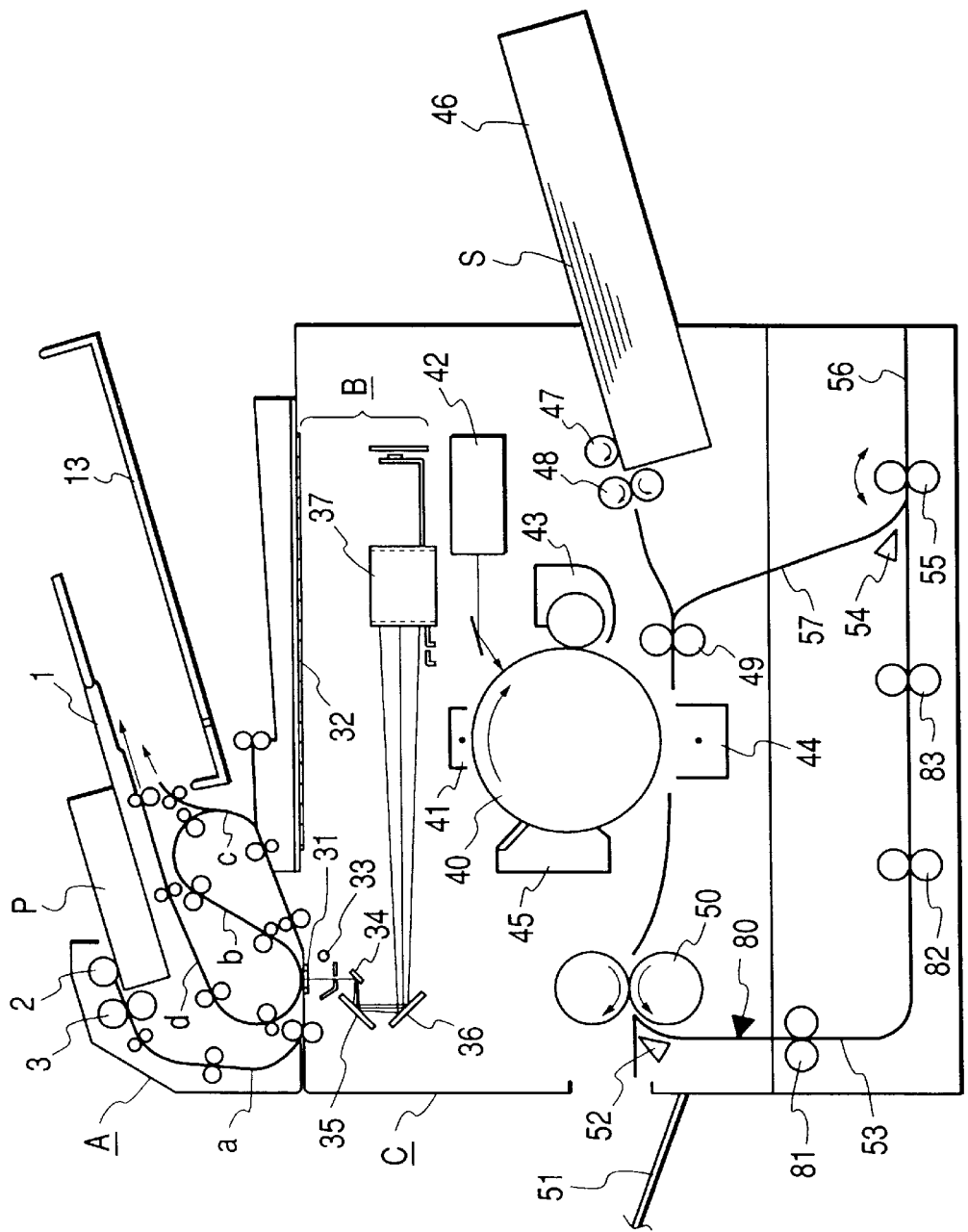
FIG. 11 schematically shows the construction of an embodiment of an image forming apparatus provided with a sheet material conveying apparatus to which the present invention is applied.

The above-described image reading apparatus B can also be integrally mounted (contained) in a main body of an image forming apparatus such as a copying apparatus or a printer, and an example of it is shown in FIG. 11.

In the present embodiment, an image forming main body C is a laser beam printer utilizing the electrophotographic process. The above-described image reading apparatus B is contained in this image forming main body C. Also, the automatic original feeding apparatus A is openably and closably mounted with respect to the upper surface of the image forming main body C.

In FIG. 11, the reference numeral 40 designates a photosensitive drum (an image forming portion), the reference numeral 41 denotes a primary charger, the reference numeral 42 designates a laser scanner, the reference numeral 43 denotes a developing device, the reference numeral 44 designates a transfer charger, the reference numeral 45 denotes a cleaner, the reference numeral 46 designates a sheet supply cassette, the reference numeral 47 denotes a sheet feeding roller, the reference numeral 48 designates a pair of conveying rollers, the reference numeral 49 denotes a pair of register rollers, the reference numeral 50 designates a fixating device, and the reference numeral 51 denotes a sheet discharge tray. The reference numerals 52 to 57 and 80 to 83 designate a reversing re-feeding path mechanism portion (both-surface path) for sheet having its first surface printed for a both-surface printing mode, and the reversing re-feeding path mechanism portion comprises a first flapper 52, a reversing path 53, a second flapper 54, a pair of switch-back rollers (a pair of forwardly and reversely rotatable rollers) 55, a switch-back path 56, a re-feeding path 57, a sheet detecting sensor 80, and pairs of conveying rollers 81, 82 and 83.

The operation and control of the automatic original feeding apparatus A are as already described in the previous embodiment, and the present invention is also effective in the conveyance control of a recording sheet S in an image forming main body C according to the present embodiment. The conveyance control in that case will hereinafter be described.

A recording sheet S supplied from the sheet supply cassette 46 has an image formed on its first surface in a known process by the photosensitive drum 40, the primary charger 41, the developing device 43, the transfer charger, etc., whereafter it is conveyed to the fixating device 50, whereby the image on the recording sheet is fixated. When the image formation is to be ended with only the image formation on one surface, the recording sheet S is intactly discharged onto the sheet discharge tray 51.

On the other hand, when an image is to be also formed on the back surface of the recording sheet S, the recording sheet S is directed into the reversing path 53 by the flapper 52, and is conveyed to the switch-back path 56 by the pairs of conveying rollers 81, 82 and 83. The recording sheet S reversed in the switch-back path 56 passes through the re-feeding path 57 and is again conveyed to the photosensitive drum 40, and an image is formed on the second surface of the recording sheet S by an image forming process similar to that for the first surface, thenafter the recording sheet S is discharged onto the sheet discharge tray 51 via the fixating device 50.

As in the case of the above-described image reading apparatus, in the present digital image processing apparatus, the order of outputting of image data accumulated in a memory can be freely selected. So, a plurality of sheets having images formed on their first surfaces are contained at predetermined intervals in the reversing path 53, the switch-back path 56 and the re-feeding path 57, thenafter images can be successively formed on the second surfaces corresponding to the back surfaces during the re-feeding of the sheets.

By the image processing and conveyance of such a plurality of sheets being collectively effected, when for example, some of originals comprising a plurality of both-surface originals are to be copied, it is not necessary to reverse recording sheets S one by one and form images on the front and back surfaces in succession. However, the processing of a plurality of sheets can be done at a time, and therefore the total image processing speed can be greatly improved.

When an attempt is made to process a plurality of recording sheets by such control, if as in the conveyance control in the image reading apparatus already described, a delay occurs to the sheet interval between the recording sheets due to the irregularity of the feed timing from the sheet supply cassette 46 or the like, there arises a state in which a predetermined number of recording sheets S cannot be contained in the both-surface path from the reversing path 53 to the re-feeding path 57. In such a case, the sheet interval between the recording sheets S conveyed to the reversing path 53 is detected by a sheet detecting sensor 80, and if the sheet interval exceeds a predetermined value, the preceding recording sheet is decelerated or stopped in that case. As a result, the sheet interval between the preceding recording sheet and the succeeding recording sheet is kept at a predetermined distance, so that a predetermined number of recording sheets can be contained in the both-surface path. Thus, processing becomes possible without greatly reducing the processing speed for the recording sheets.

OTHER EMBODIMENTS

Figure 12:
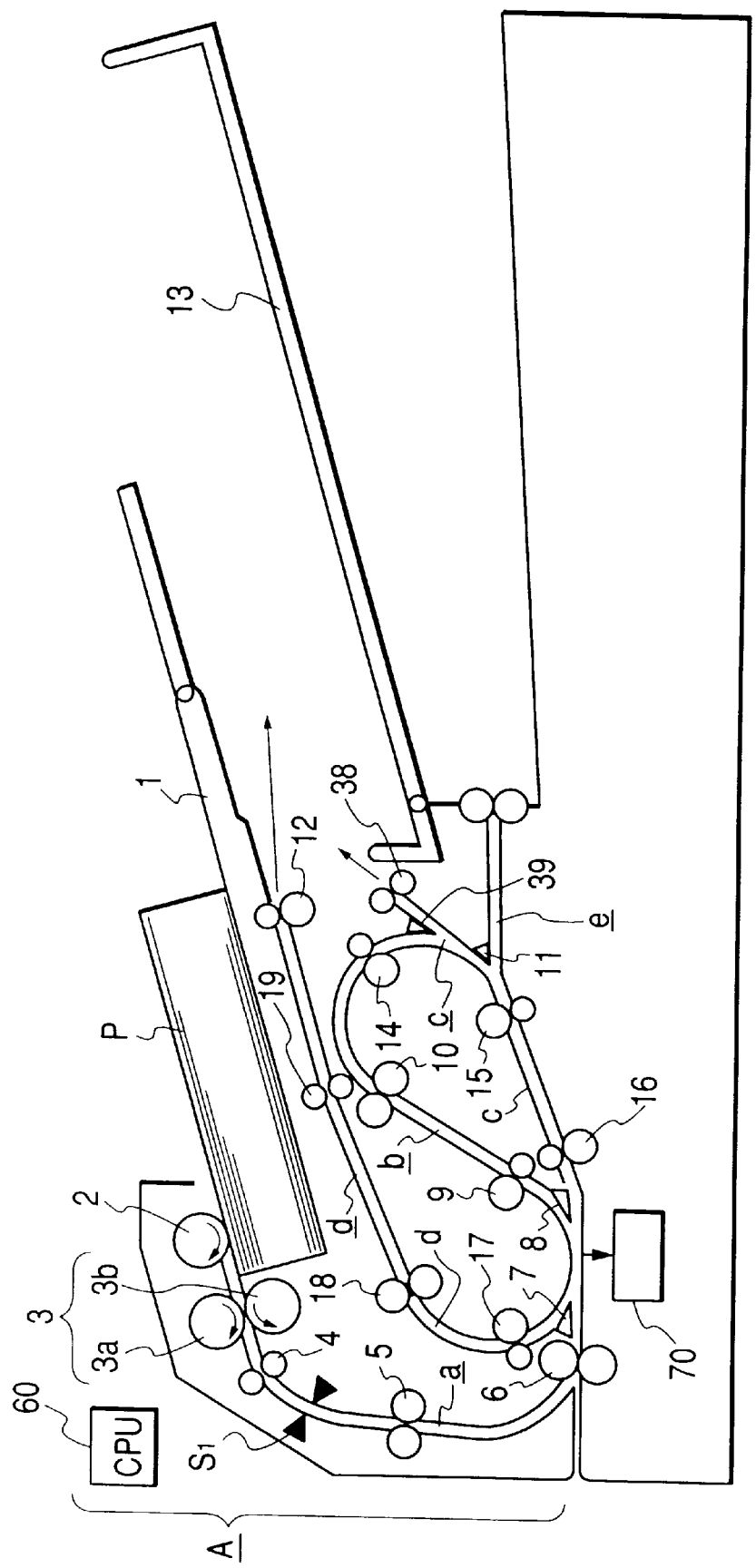
FIG. 12 schematically shows the construction of an embodiment of an image forming apparatus provided with a recording sheet conveying apparatus to which the present invention is applied.

Besides the afore described embodiments, as shown, for example, in FIG. 12, the present invention can be effectively applied to a printer as an image processing apparatus. In FIG. 12, the reference numeral 70 designates a recording head (an ink jet head) in a printer, and it is possible to record a desired image by a controller (not shown). In this embodiment, a recording head of the ink jet type is shown as the recording head, but this is not restrictive. Also, the construction of a conveying apparatus for conveying recording sheets is similar to that of the afore described automatic original feeding apparatus A, so like reference numerals are given and the description thereof is omitted. That is, the present printer is also designed such that a predetermined number of recording sheets are contained and reversed in the reversing path b and c and recording is effected on the front and back surfaces of the recording sheets. By applying the present invention to this printer, that is, by effecting conveyance control similar to that in the afore described automatic original feeding apparatus, a reduction in the processing speed for recording sheets can be minimized.

Figure 13:
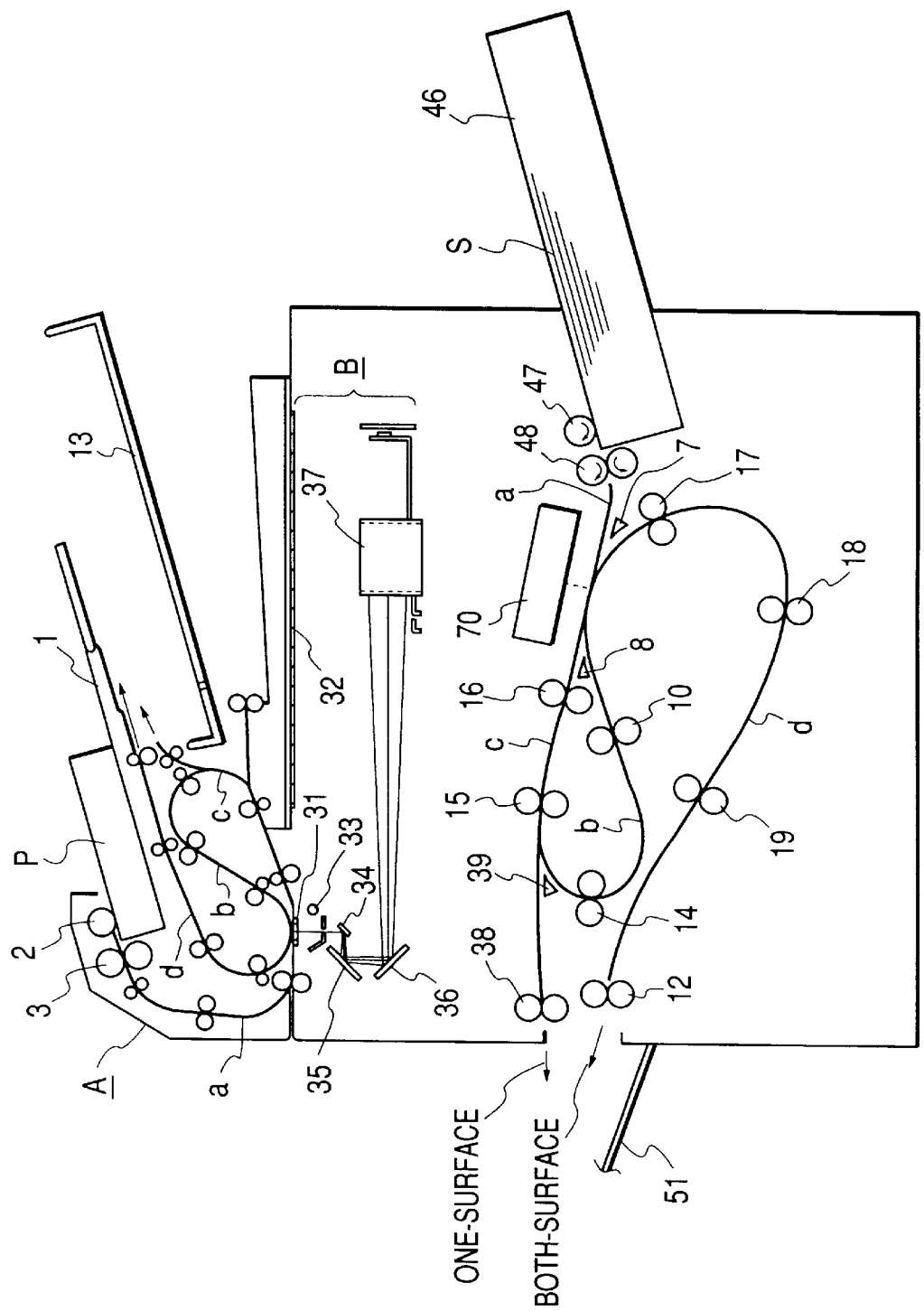
FIG. 13 schematically shows the construction of an embodiment of an image processing apparatus provided with a sheet material conveying apparatus to which the present invention is applied.

Also, as shown in FIG. 13, the present invention can be effectively applied to an image processing apparatus comprising a combination of the afore described printer and the image reading apparatus B provided with the automatic original feeding apparatus A. In FIG. 13, members functionally equal to those in the afore described embodiments are given the same reference numerals. The apparatus shown in FIG. 13 is designed such that images on both surfaces of an original are read while the original is reversed and conveyed by the automatic original feeding apparatus A having reversing paths b and c and said read image data are recorded on both surfaces of a recording sheet while the recording sheet is reversed and conveyed by the printer having reversing paths b and c. The conveying paths for and the conveyance control of the original as a sheet material and the recording sheet are similar to those in the afore described embodiments, and therefore need not be described in detail herein. By applying the present invention to this image processing apparatus, an effect similar to that of the afore-described embodiments is obtained. And it becomes possible to realize an image processing apparatus of the integral type for efficiently reading a both-surface original and at the same time, efficiently forming images on both surfaces of a recording sheet.

Also, in the afore described embodiments, the size and number of sheet materials containable in the reversing paths have been shown as one sheet of A3 size and two sheets of A4 size, whereas the present invention is not restricted thereto, but the length of the reversing paths can be suitably set as required.

What is claimed is:

1. A sheet material conveying apparatus comprising:

a conveying path for directing sheet materials to an image processing position and directing them to a discharging portion after completion of image processing; and a surface reversing path containing a predetermined number of sheet materials, with a space interval between each of the sheet materials, the surface reversing path for reversing and directing the sheet materials to the image processing position, wherein when the interval between the predetermined number of sheet materials to be directed into said reversing path widens to such an extent that the sheet materials cannot be contained in the reversing path, a preceding one of said sheet materials is decelerated or stopped in conformity with said widening to enable said predetermined number of sheets to be contained in the reversing path.

2. A sheet material conveying apparatus according to claim 1, wherein said image processing is an image reading process capable of reading the images on front surface and back surface of an original as the sheet material.

3. A sheet material conveying apparatus according to claim 1, wherein said image processing is an image forming process capable of recording and forming images on the front and back surfaces of a recording sheet as the sheet material.

4. An image forming apparatus provided with a sheet material conveying apparatus according to claim 2 or 3.

5. An image forming apparatus provided with sheet material conveying apparatuses according to claims 2 or 3.

6. A sheet material conveying apparatus according to claim 1, wherein the preceding sheet material is decelerated or stopped after completion of the image processing at said image processing position, and is then conveyed at a predetermined speed when the interval between the preceding sheet material and a succeeding sheet material becomes a predetermined interval.

7. A sheet material conveying apparatus according to claim 6, wherein when the preceding sheet material and the succeeding sheet material are conveyed at the predetermined interval in the reversing path and the succeeding sheet material passes said image processing position, a next succeeding sheet material arrives at said image processing position.

8. A sheet material conveying apparatus according to claim 1, further comprising separating and feeding means for separating the sheet materials supported on a supporting portion one by one and feeding them; and detecting means provided downstream of said separating and feeding means for detecting the sheet materials;

wherein said detecting means includes timing means and also detects a delay during the separation and feeding of the sheet materials.

9. A sheet material conveying apparatus according to claim 1, wherein when the preceding sheet material is delayed, a succeeding sheet material is delayed by corresponding amount.

10. A sheet material conveying apparatus according to claim 1, wherein the conveying path has an introduction path to the image processing position, and a discharging path for directing the sheet materials discharged from said image processing position to the discharging portion; the reversing path has a loop path for reversing the sheet materials discharged from said image processing position and again directing them to said image processing position; and said introduction path and said discharging path are on one side of said image processing position, and said loop path is on the other side of said image processing position.

11. A sheet material conveying apparatus according to claim 10, wherein said loop path is of a length capable of containing therein one sheet material of A3 size and two sheet materials of A4 size at a time.

12. A sheet material conveying apparatus according to claim 10, further comprising a detecting means for detecting the passage of the sheet materials in the course of the introduction path.

13. A sheet material conveying apparatus according to claim 12, further comprising a separating and feeding means for separating the sheet materials supported on a supporting portion one by one and feeding them.

14. A sheet material conveying apparatus according to claim 2, wherein the reading of the sheet material original is effected with a fixed optical system and the sheet material original is conveyed.

15. An image forming apparatus provided with a sheet material conveying apparatus according to one of claims 1 to 3 or 6 to 14.

* * * * *

UNITED STATES PATENT AND TRADEMARK OFFICE
CERTIFICATE OF CORRECTION

PATENT NO. : 6,032,941

DATED : March 7, 2000

INVENTOR(S): SAIJIRO ENDO

It is certified that error appears in the above-identified patent and that said Letters Patent is hereby corrected as shown below:

COVER PAGE AT ITEM [56] RC:
Foreign Patent Documents: "0370784 3/1992 European Pat. Off." should be deleted.

COVER PAGE AT ITEM [54]:
Title: "INTERNAL" should read --INTERVAL--.

Figure 9:
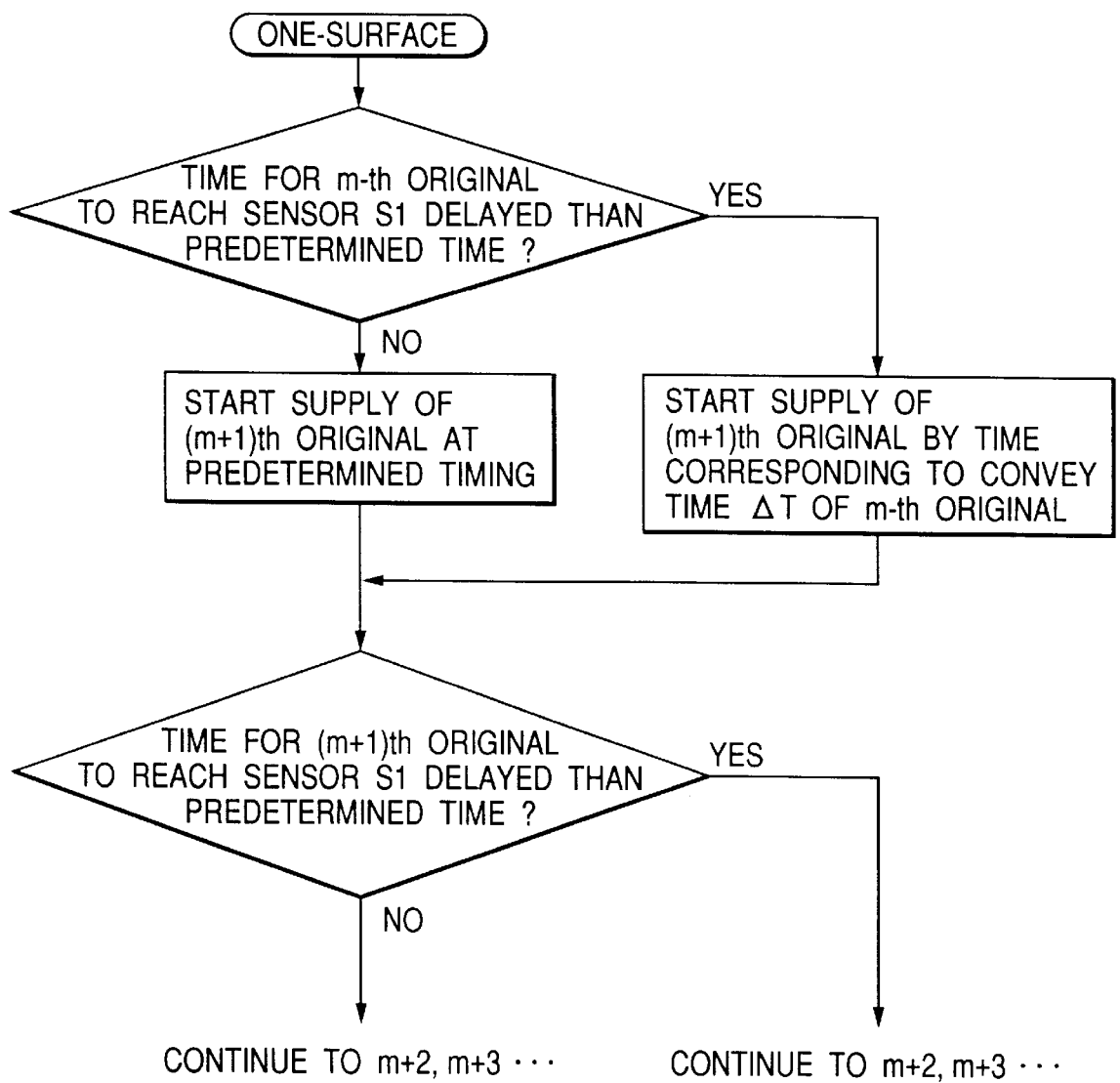
FIG. 9 is a flow chart showing the flow of the operation of conveyance control for a one-surface original.

SHEET NO. 9:
Figure 9, "THAN" should read --THEN--.

Figure 10:
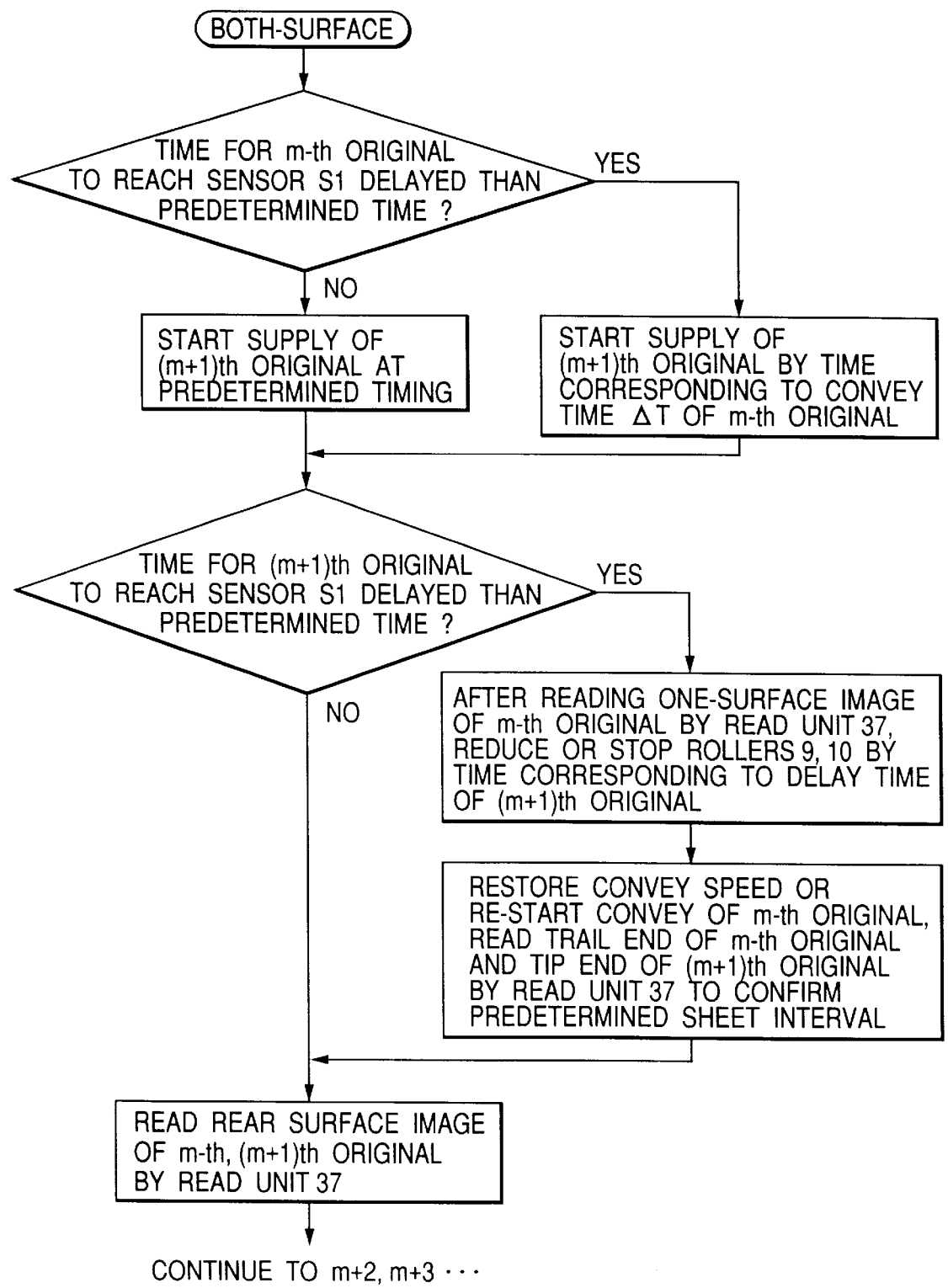
FIG. 10 is a flow chart showing the flow of the operation of conveyance control for a both-surface original.

SHEET NO. 10:
Figure 10, "THAN" should read --THEN--.

COLUMN 10:
Line 59, "afore described" should read --aforedescribed--.

UNITED STATES PATENT AND TRADEMARK OFFICE
CERTIFICATE OF CORRECTION

PATENT NO. : 6,032,941

DATED : March 7, 2000

INVENTOR(S): SAIJIRO ENDO

It is certified that error appears in the above-identified patent and that said Letters Patent is hereby corrected as shown below:

COLUMN 11:
Line 1, "afore described" should read --aforedescribed--.

Signed and Sealed this

Twentieth Day of March, 2001

Attest:

NICHOLAS P. GODICI

Attesting Officer    Acting Director of the United States Patent and Trademark Office